(No Model.) 2 Sheets—Sheet 2.
C. V. EGGLESTON.
CATTLE PUMP.
No. 597,639. Patented Jan. 18, 1898.
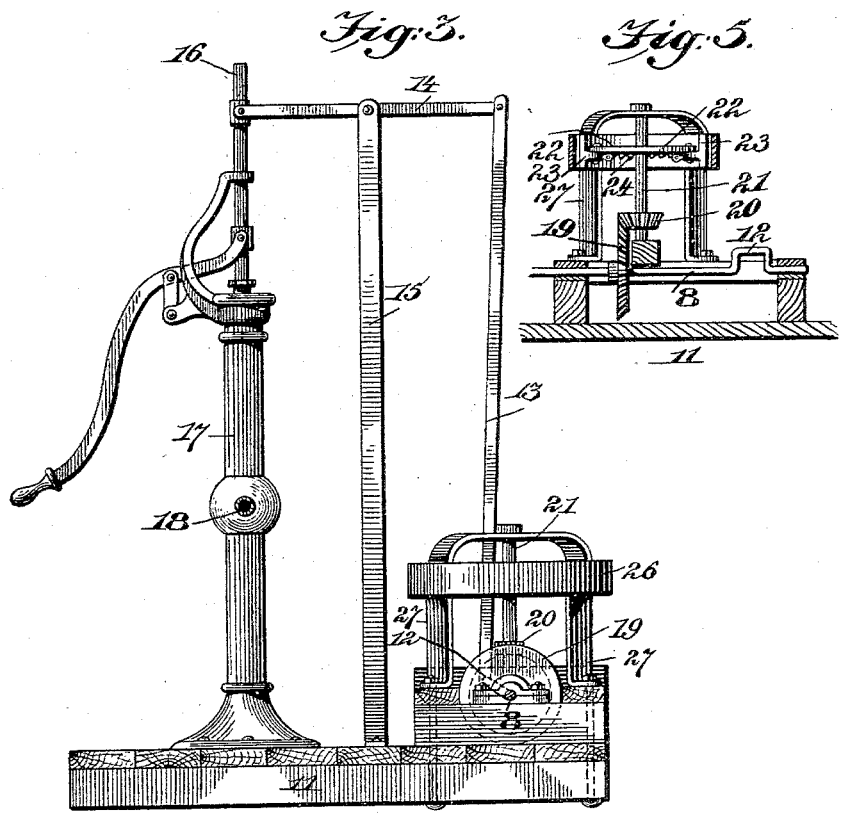
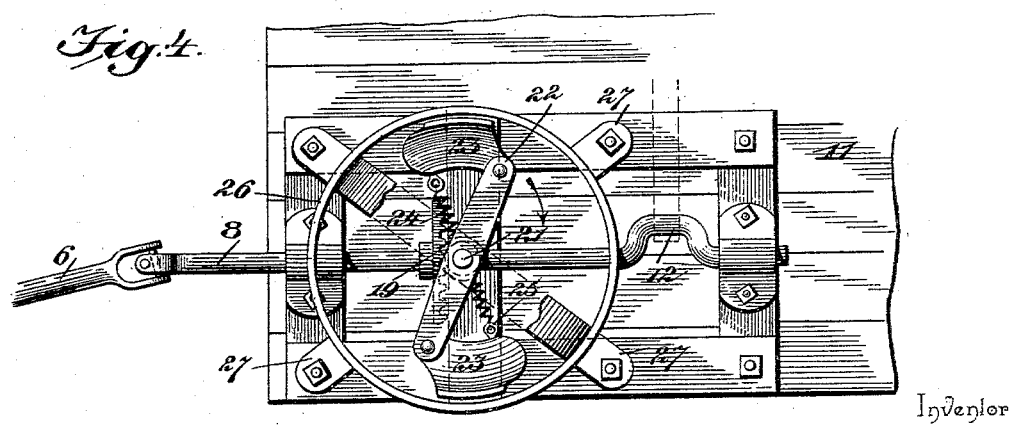
Witnesses
H. G. Dieterich
V. B. Hillyard.
Inventor
Clarence V. Eggleston,
By his Attorneys,
C. A. Snow & Co.

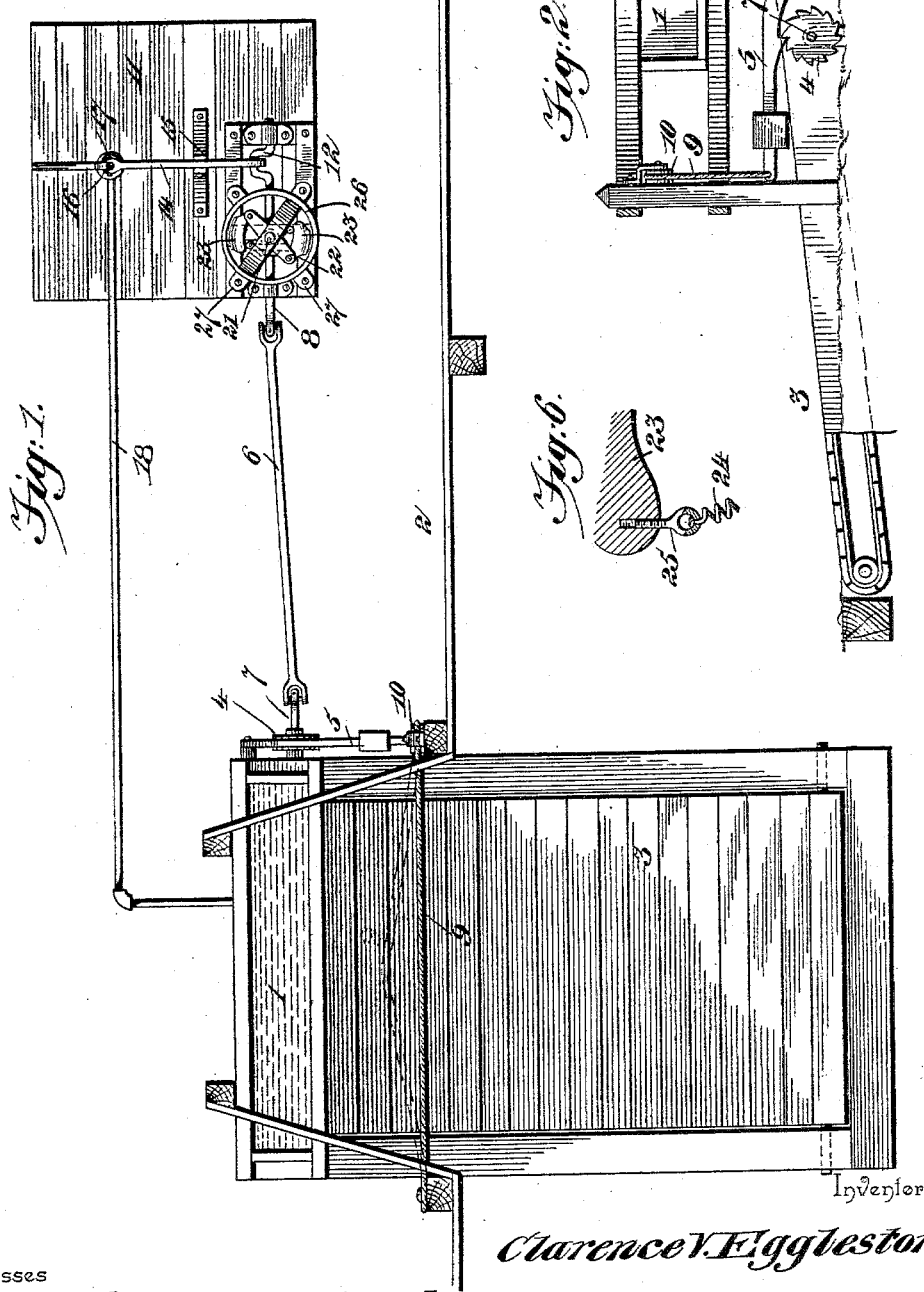

UNITED STATES PATENT OFFICE.

CLARENCE V. EGGLESTON, OF EDMOND, OKLAHOMA TERRITORY.

CATTLE-PUMP.

SPECIFICATION forming part of Letters Patent No. 597,639, dated January 18, 1898.

Application filed February 3, 1897. Serial No. 621,807. (No model.)

*To all whom it may concern:*

Be it known that I, CLARENCE V. EGGLESTON, a citizen of the United States, residing at Edmond, in the county of Oklahoma and Territory of Oklahoma, have invented a new and useful Cattle-Pump, of which the following is a specification.

This invention relates to stock-watering devices which utilize the weight of the animal as a means for pumping water into a trough to supply that taken out by the animal when drinking.

A special feature of this invention is to control the speed of the pumping mechanism and to release the latter by the animal when the latter approaches the trough sufficiently close to drink therefrom. The means for utilizing the weight of the animal is an endless tread, which is normally locked, but which is released by the animal when it reaches a position to take water from the trough, thereby permitting the pump to operate during the time that the animal is drinking, but which will become automatically locked the instant the animal backs away from the trough a short distance or steps from the tread.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a stock-watering trough and the means for replenishing the exhausted water. Fig. 2 is a detail view of the tread-power, showing the locking mechanism therefor. Fig. 3 is a detail view of a pump and its operating mechanism. Fig. 4 is a top plan view of the means for regulating the speed. Fig. 5 is a detail view in elevation of the speed-controlling mechanism. Fig. 6 is a detail view showing the means for varying the tension of the springs which govern the brake-shoes.

Corresponding and like parts are referred to in the following description and indicated in the several views of the accompanying drawings by the same reference-characters.

The watering-trough 1 is located in a depression in the line of fencing 2, so as to compel the stock to approach the same from one direction. A tread-power 3 of ordinary construction is located opposite the watering-trough and inclines therefrom in the usual way to compel the animal to operate the tread when drinking. The shaft or journal of the roller adjacent to the trough is extended, and a ratchet-wheel 4 is secured thereto and cooperates with a weighted detent-lever 5 to lock the tread-power except when an animal is drinking. A tumbling-rod 6 connects the shaft 7 with a corresponding shaft 8 of the pump-actuating mechanism and serves to transmit power from the tread-power to the pump-operating mechanism.

Under normal conditions the tread-power is locked, and a releasing mechanism is provided to be operated by an animal when drinking, and this releasing mechanism consists of a cord or chain 9, extending transversely across the end portion of the tread-power adjacent to the trough 1 and is located at such an elevation as to be engaged by an animal when drinking. This cord or chain is secured at one end to a fence-post and passes over a pulley 10, secured to the fence-post at the opposite side of the tread-power, and is attached to the detent-lever 5. The parts are so adjusted that normally the detent-lever engages with a ratchet-tooth of the part 4 and locks the tread and that portion of the cord between the fence-posts will be straight. Upon an animal approaching the watering-trough its chest or fore part will engage with the rope or chain and deflect it out of a straight line and elevate the weighted end of the detent-lever and release the tread, which latter will operate in the ordinary manner. By having the cord or chain 9 located near the trough end of the tread-power the animal will occupy a full position upon the tread prior to the releasing of the latter, and as the animal makes the final step forward to reach the trough it will come in contact with the releasing mechanism and liberate the tread-power and permit the latter to operate. After the animal has satiated its thirst and backs away from the trough the locking mechanism will regain itself and automatically stop the movement of the tread-power, thereby permitting the animal to leave the tread without any fear of injury.

Any suitable means may be applied to the detent 5 for returning it to a normal position, whereby the cord or chain 9 is straightened and the toothed part of the detent caused to engage with a tooth of the ratchet-wheel, and, as shown, a weight is applied to the free end of the detent for attaining the desired end.

The shaft 8 is journaled in suitable bearings upon the pump-stand 11 and has a crank 12, to which the lower end of a rod 13 is connected, the upper end of the said rod being attached to one end of a lever 14, fulcrumed to a support 15 and having its opposite end connected with the rod 16 of a pump 17. This pump is of ordinary construction and a pipe 18 connects it with the trough 1 for supplying water thereto. A gear-wheel 19 is secured upon the shaft 8 and meshes with a pinion 20 upon a vertical shaft 21, the latter being provided with a governor mechanism to control the speed of the tread-power. A bar 22 is secured at a middle point to the shaft 21 and brake-shoes 23 have pivotal connection at one end with the extremities of the bar 22 and their opposite ends have adjustable connection with springs 24, screw-eyes 25, having swivel connection with the outer terminals of the springs 24 and screw-thread connection with the brake-shoes, serving as the means for varying the tension of the springs 24, whereby the speed of the tread-power is controlled. A ring or circular band 26 is located in the plane of the brake-shoes 23 and concentric with the shaft 21 and is secured to the pump-stand by feet 27, and the brake-shoes 23 are adapted to bear against the inner surface of this ring and check the speed of the tread-power when the same tends to exceed a predetermined rate. These brake-shoes fly outward by centrifugal action and are held out of action by the springs 24. Under normal conditions the brake-shoes are inactive, but should the speed abnormally increase the brake-shoes will fly outward and bear against the inner side of the ring and increase the load and thereby diminish the speed.

Having thus described the invention, what is claimed as new is—

1. In means for watering stock, the combination of a power actuated by the weight of an animal, a locking mechanism for normally securing the power against movement, and a release mechanism actuated by direct impact with the animal when in the act of drinking to liberate the locking mechanism and permit the power to operate, substantially in the manner and for the purpose described.

2. In means for watering stock, the combination of a power actuated by the weight of an animal, a locking mechanism for normally securing the power against movement, a detent, and a release mechanism projected in the path of the animal and operated by the animal on approaching the trough to effect a release of the locking mechanism, substantially in the manner and for the purpose specified.

3. In means for watering stock, the combination of a power actuated by the weight of an animal, a detent for normally locking the power, a cord or chain secured at one end and having connection at its opposite end with the said detent, and extending across the path of the animal to be deflected on the approach of the animal to the trough to release the power, and means for returning the detent into operative position and bringing the cord into normal condition upon the animal leaving the trough, substantially as set forth.

4. In means for watering stock, the combination of a power actuated by the weight of an animal, a pump operated by means of the power for supplying water to the trough, actuating mechanism intermediate of the pump and power for transmitting motion from the power to the pump, a governor for controlling the speed of the said actuating mechanism and power, a locking mechanism normally securing the power against movement, and a release mechanism having a portion projecting within the path of the animal to be operated by direct impact therewith of the animal on approaching the trough, whereby the locking mechanism is released, substantially as set forth.

In testimony that I claim the foregoing as my own I have hereto affixed my signature in the presence of two witnesses.

CLARENCE V. EGGLESTON.

Witnesses:
P. H. PETITPILS,
T. B. OVERSTREET.